Patented Sept. 23, 1930

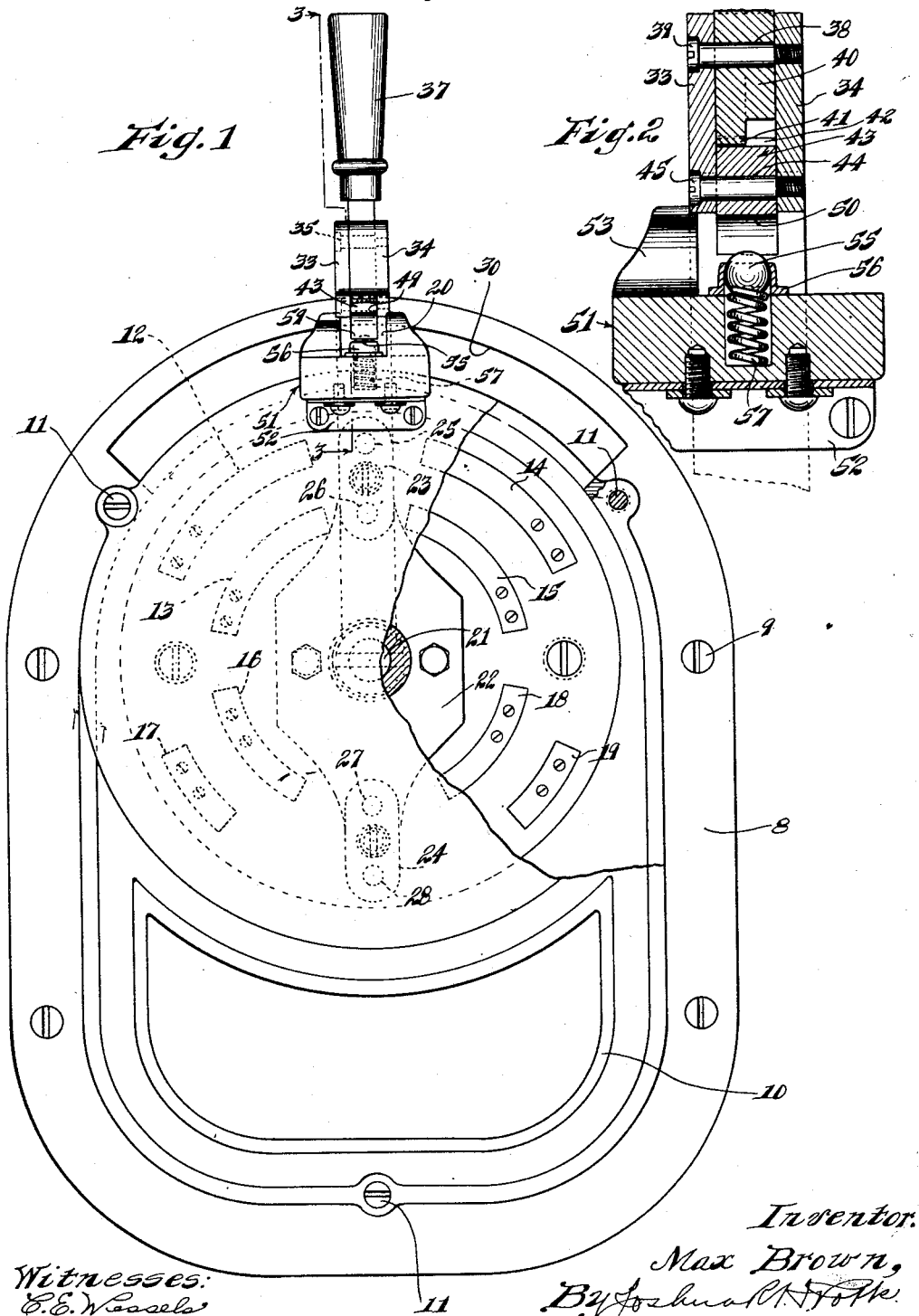

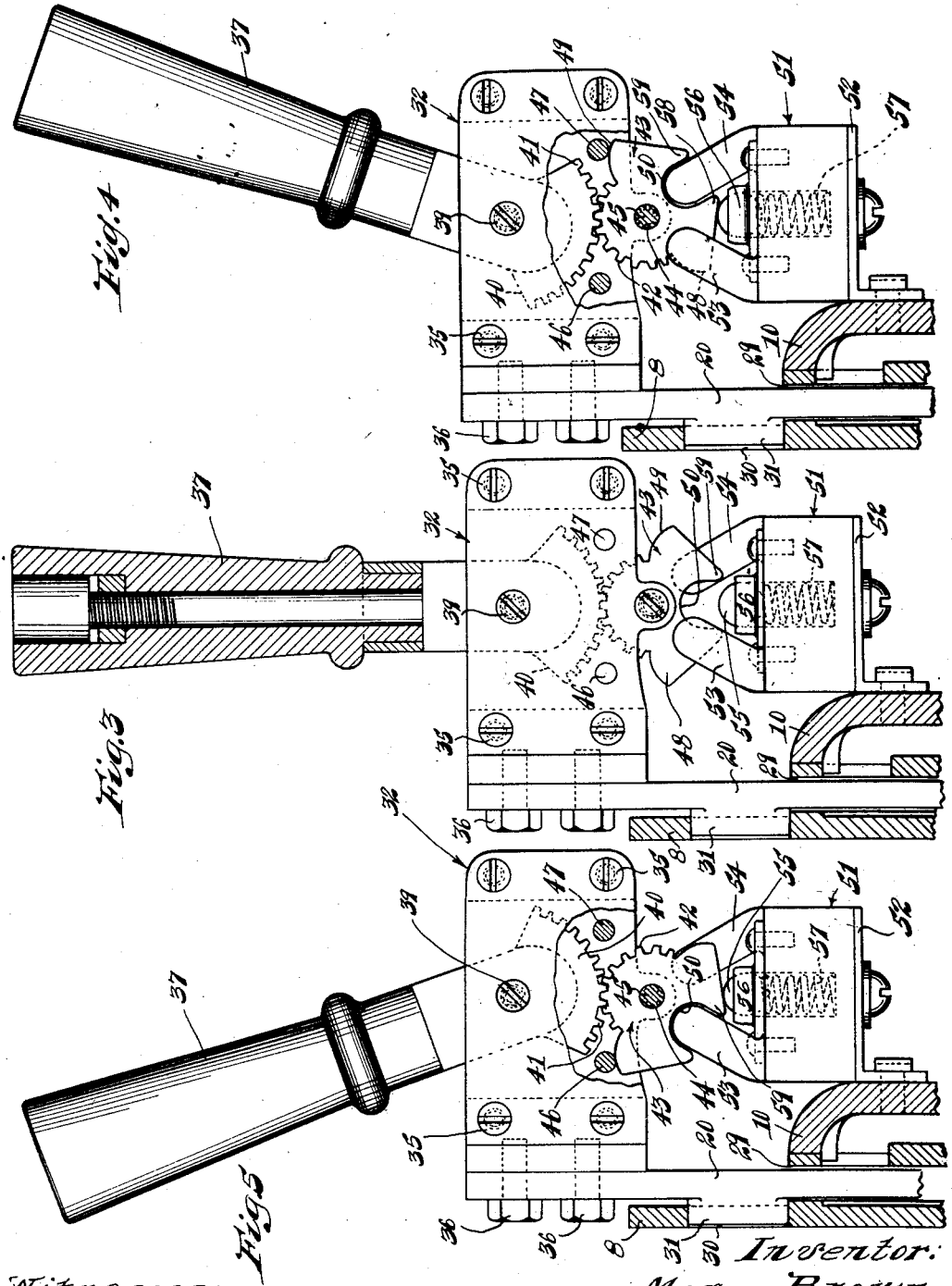

1,776,413

UNITED STATES PATENT OFFICE

MAX BROWN, OF CHICAGO, ILLINOIS

REVERSE CONTROL FOR ELECTRIC MOTORS

Application filed April 25, 1929. Serial No. 358,001.

This invention relates to a reverse control for electric motors and an object of the invention is the provision of an improved device of this character whereby in operating the switch lever for changing the direction of rotation of the connected motor armature, a sufficient pause is enforced between breaking the circuit of one switch connection and closing the circuit of the reversing switch connection to prevent burning out of fuses or other damage to the electric equipment. Unless means are provided for insuring an interruption in the opening and closing of circuits to reverse the direction of travel of a motor power shaft, the sudden closing of a circuit for a reverse direction while the motor and connected mechanism are under momentum in an opposite direction, often results in the burning out of fuses and other injury, with the consequent loss of time and expense in making repairs, and it is therefore an object of the present invention to provide a device which will require an interruption between the closing of two reversing circuits, of sufficient duration to prevent the burning out of fuses or other injury to the electrical or associated mechanism.

Other objects will appear hereinafter.

The invention consists in the combinations and arrangements of parts hereinafter described and claimed.

The invention will be best understood by reference to the accompanying drawings forming a part of this specification, and in which:

Fig. 1 is a front elevational view of the device with the housing partly broken away, and showing the switch operating lever in neutral position;

Fig. 2 is a detailed sectional view taken substantially on the line 2—2 of Fig. 3;

Fig. 3 is a view, partly in section, taken substantially on the line 3—3 of Fig. 1;

Fig. 4 is a view similar to Fig. 3 with the operating handle in position to permit a switch control lever to be moved toward the right from the neutral position shown in Fig. 1; and Fig. 5 is a view similar to Fig. 4, showing the operating handle in position to permit the switch control lever to be moved toward the left from the position shown in Fig. 1.

The device of the invention may be utilized to advantage in connection with any circuit reversing switch, and the preferred embodiment illustrated is particularly adapted to a passenger or freight elevator. A housing base plate 8 may be secured by means of screws 9 to the wall of the car, and is provided with a cover plate 10 detachably secured to the base plate 8 by means of screws 11. For the purpose of alternately reversing the direction of travel, a plurality of contact bars 12, 13, 14, 15, 16, 17, 18, and 19, may be mounted as shown upon base plate 8. A switch control lever 20 is preferably keyed to a centrally disposed shaft 21, and also keyed to shaft 21 is brush carrier 22, preferably composed of non-conducting material and carrying oppositely disposed brush yokes 23 and 24. Brushes 25 and 26 are adapted to bear against bars 12 and 13 to close the circuit through yoke 23 for one direction of travel, and are adapted to bear against bars 14 and 15 to close the circuit in an opposite or reverse direction of travel. Similarly, brushes 27 and 28 are adapted to alternately close the circuits through brush yoke 24 of bars 16 and 17 for one direction, and bars 18 and 19 for an opposite or reverse direction. It will be understood that bars 16, 17, 18 and 19 may represent auxiliary or secondary switch contact bars, and the device of the invention is adapted to use in connection with a switch plate having any desired modification with regard to the location or arrangement of the contact plates or bars.

Formed between base plate 8 and cover member 10 is an arcuate slot 29 through which switch lever 20 is adapted to be manually operated, and similarly, to enhance smoothness of operation, base plate 8 is provided with an arcuate slot 30 engaged by projection 31 upon switch lever 20.

Extending forwardly from switch lever 20 is a handle supporting member 32 which may be formed of a pair of side plates 33 and 34 suitably held together by screws 35 extending through spacers, and the entire handle supporting member attached to lever 20 by means of bolts or screws 36. An operating handle 37 is pivotally mounted adjacent its lower end at 38 upon member 32, preferably between plates 33 and 34 by means of threaded pivot pin 39. The lower extremity of handle 37 carries a gear segment 40, the teeth 41 of which are adapted to mesh with teeth 42 upon latch member 43 pivotally mounted at 44 upon member 32, preferably between plates 33 and 34, upon threaded pivot pin 45, similar to the pivotal mounting of handle 37. A pin 46 is provided in member 32 for limiting the movement of latch member 43 in one direction, as shown in Fig. 5, and a second pin 47 is similarly provided to limit the rotational movement of latch 43 in the opposite direction, as shown in Fig. 4. Latch 43 is provided with oppositely disposed shoulder portions 48 and 49 and is also provided with a groove 50 for the purpose of cooperating to enforce interruption of movement of switch lever 20 at the neutral point as next explained.

Mounted upon the upper and forward portion of cover member 10, as shown in Figs. 3, 4, and 5, is a keeper block 51 which may be supported by bracket 52 and which carries on its upper surface angularly disposed lugs 53 and 54. In the present embodiment, as shown in Figs. 3 to 5, lugs 53 and 54 are offset in both a plane parallel to the plane in which switch lever 20 travels, as shown in Fig. 1, and in a plane perpendicular thereto as shown in Figs. 3 to 5. Further, in the present embodiment, lugs 53 and 54 converge slightly, as shown in Figs. 3 to 5, and the free end of each lug 53 and 54 is formed to pass through groove 50 of latch 43 in alternative positions of the latter. Projecting above the upper surface of keeper block 51 is a ball check 55 normally maintained seated in a seat provided in plate 56 by means of compression spring 57 confined in a bore of block 51.

When handle 37 is moved from the position shown in Fig. 3 to the position shown in Fig. 4 to permit handle 37 to be moved toward the right from the position shown in Fig. 1, projection 58 depresses ball check 55, and in the position shown in Fig. 4, ball check 55 maintains an upward thrust upon the adjacent surface which serves to maintain groove 50 in alignment with lug 54; and, similarly, when handle 37 is rocked to the position shown in Fig. 5, projection 59 causes a slight depression of ball check 55, and the latter maintains an upper pressure against the adjacent surface of latch 43, assisting to maintain groove 50 in alignment with lug 53. In addition, when switch lever 20 is suddenly moved from either of the switch closing positions to the neutral position, ball check 55 serves to absorb a portion of the force.

The operation of the device is as follows: In the positions shown in Figs. 1 and 3, switch lever 20 is in neutral position and the circuit broken on all the switches. Further, ball check 55 projects a slight distance into groove 50 and thus serves to prevent the accidental displacement of handle 37 to either the position shown in Fig. 4 or Fig. 5, whereby switch lever 20 could be swung to a switch closing position. To swing switch lever 20 in a counter-clockwise direction from the position shown in Fig. 1, handle 37 is moved from the position shown in Fig. 3 to the position shown in Fig. 5, latch 43 being arrested by pin 46 in position, bringing the upper end of lug 53 in registry with groove 50. Simultaneously projection 59 depresses ball check 55 and at the completion of this movement the latter maintains an upward thrust on the surface adjacent projection 59, as shown in Fig. 5. The alignment of lug 53 with groove 50 then permits switch lever 20 to be moved in a counter-clockwise direction from the position shown in Fig. 1 to close the circuit successively through bars 12, 13, 18 and 19 which may be connected to the necessary rheostat and motor terminals. To swing switch lever 20 in a clockwise direction from the position last described, so as to bring brushes 25, 26, 27 and 28 in contact with plates 14, 15, 16 and 17, respectively, it is necessary to pass through the neutral position shown in Figs. 1 and 3, and it is also necessary, in this neutral position, to rock handle 37 from the position shown in Fig. 5 to that shown in Fig. 4. Upon reaching the neutral position the movement of switch lever 20 and the entire mechanism mounted thereon, is arrested by the contact of shoulder 49 with lug 54. To continue the motion of lever 20 in a clockwise direction from the position shown in Fig. 1, it then becomes necessary to rock handle 37 to the position shown in Fig. 4, bringing lug 54 in registry with groove 50, whereupon switch lever may be swung to close the circuits upon plates 14, 15, 16 and 17, as described, to reverse the rotation of the connected motor. Correspondingly, the movement of switch lever 20 in a counter-clockwise direction is arrested at the neutral position by engagement of shoulder 48 with lug 53, necessitating the movement of handle 37 to the position shown in Fig. 5 before the counter-clockwise travel can be resumed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In combination, a reversing switch provided with reversing circuit contacts and an intermediate neutral point, a switch control lever provided with contact members adapted to alternately close said reversing circuits, a keeper block mounted adjacent said neutral point, an operating handle pivotally mounted upon said control lever, and means upon said keeper block adapted to cause said control lever to reach a full stop in being shifted from one circuit closing position to a reversing circuit closing position, substantially as described.

2. In combination, a reversing switch provided with reversing circuit contacts and an intermediate neutral point, a switch control lever provided with contact members adapted to alternately close said reversing circuits, a keeper block mounted adjacent said neutral point, an operating handle pivotally mounted upon said control lever, a latch member pivotally mounted upon said control lever and operatively connected to said operating handle, and means upon said keeper block adapted to engage said latch member and require said latch member to be rotated by said operating handle at said neutral point, in shifting said control lever from one circuit closing position to a reversing circuit closing position, substantially as described.

3. In combination, a reversing switch provided with reversing circuit contacts and an intermediate neutral point, a switch control lever provided with contact members adapted to alternately close said reversing circuits, a keeper block mounted adjacent said neutral point, an operating handle pivotally mounted upon said control lever, a latch member pivotally mounted upon said control lever and operatively connected to said operating handle, means upon said keeper block adapted to engage said latch member and require said latch member to be rotated by said operating handle at said neutral point, in shifting said control lever from one circuit closing position to a reversing circuit closing position, and means upon said keeper block for normally maintaining said operating handle in an adjusted position, substantially as described.

4. In combination, a reversing switch provided with reversing circuit contacts and an intermediate neutral point, a switch control lever provided with contact members adapted to alternately close said reversing circuits, a keeper block mounted adjacent said neutral point, an operating handle pivotally mounted upon said control lever, and means upon said keeper block adapted to cause said control lever to reach a full stop and require said operating handle to be rotated in shifting said control lever from one circuit closing position to a reversing circuit closing position, substantially as described.

5. In combination, a reversing switch provided with reversing circuit contacts and an intermediate neutral point, a switch control lever provided with contact members adapted to alternately close said reversing circuits, a keeper block mounted adjacent said neutral point, an operating handle pivotally mounted upon said control lever, means upon said keeper block adapted to cause said control lever to reach a full stop and require said operating handle to be rotated in shifting said control lever from one circuit closing position to a reversing circuit closing position, and means upon said keeper block for normally maintaining said operating handle in an adjusted position, substantially as described.

6. In combination, a reversing switch provided with reversing circuit contacts and an intermediate neutral point, a switch control lever provided with contact members adapted to alternately close said reversing circuits, a keeper block mounted adjacent said neutral point, an operating handle pivotally mounted upon said control lever, a latch member pivotally mounted upon said control lever and provided with a groove, said latch member being operatively connected to said operating handle, a lug on said keeper block adapted to engage said latch groove and permit said control lever to be shifted from neutral position to one circuit closing position, and a second lug upon said keeper block positioned out of alignment with said first mentioned lug and adapted to engage said latch groove when said latch member has been rotated at the neutral point to permit said control lever to be shifted to a reversing circuit closing position, substantially as described.

7. In combination, a reversing switch provided with reversing circuit contacts and an intermediate neutral point, a switch control lever provided with contact members adapted to alternately close said reversing circuits, a keeper block mounted adjacent said neutral point, an operating handle pivotally mounted upon said control lever, a latch member pivotally mounted upon said control lever and provided with a groove, said latch member being operatively connected to said operating handle, a lug on said keeper block adapted to engage said latch groove and permit said control lever to be shifted from neutral position to one circuit closing position, and a second lug upon said keeper block positioned out of alignment with said first mentioned lug and adapted to engage said latch groove when said latch member has been rotated at the neutral point to permit said control lever to be shifted to a reversing circuit closing position, and means upon said latch member adapted to prevent shifting of said control lever from the neutral point to either circuit closing position in one adjustment of said operating handle, substantially as described.

8. In combination, a reversing switch provided with reversing circuit contacts and an intermediate neutral point, a switch control lever provided with contact members adapted to alternately close said reversing circuits, a keeper block mounted adjacent said neutral point, an operating handle pivotally mounted upon said control lever, a latch member pivotally mounted upon said control lever and provided with a groove, said latch member being operatively connected to said operating handle, a lug on said keeper block adapted to engage said latch groove and permit said control lever to be shifted from neutral position to one circuit closing position, and a second lug upon said keeper block positioned out of alignment with said first mentioned lug and adapted to engage said latch groove when said latch member has been rotated at the neutral point to permit said control lever to be shifted to a reversing circuit closing position, means upon said latch member adapted to prevent shifting of said control lever from the neutral point to either circuit closing position in one adjustment of said operating handle, and resilient means upon said keeper block adapted to normally maintain said operating handle in an adjusted position, substantially as described.

9. In combination, a reversing switch provided with reversing circuit contacts and an intermediate neutral point, a switch control lever provided with contact members adapted to alternately close said reversing circuits, a keeper block mounted adjacent said neutral point, an operating handle pivotally mounted upon said control lever, a latch member pivotally mounted upon said control lever and operatively connected to said operating handle, means upon said keeper block adapted to engage said latch member and require said latch member to be rotated by said operating handle at said neutral point, in shifting said control lever from one circuit closing position to a reversing circuit closing position, and means for limiting the rotational movement of said latch member, substantially as described.

10. In combination, a reversing switch provided with reversing circuit contacts and an intermediate neutral point, a switch control lever provided with contact members adapted to alternately close said reversing circuits, a keeper block mounted adjacent said neutral point, an operating handle pivotally mounted upon said control lever, a latch member pivotally mounted upon said control lever and provided with a groove, said latch member being operatively connected to said operating handle, a lug on said keeper block adapted to engage said latch groove and permit said control lever to be shifted from neutral position to one circuit closing position, and a second lug upon said keeper block positioned out of alignment with said first mentioned lug and adapted to engage said latch groove when said latch member has been rotated at the neutral point to permit said control lever to be shifted to a reversing circuit closing position, and means for limiting the rotational movement of said latch member, substantially as described.

In testimony whereof I have signed my name to this specification.

MAX BROWN.